INVENTOR.
MELVIN E. NELSON

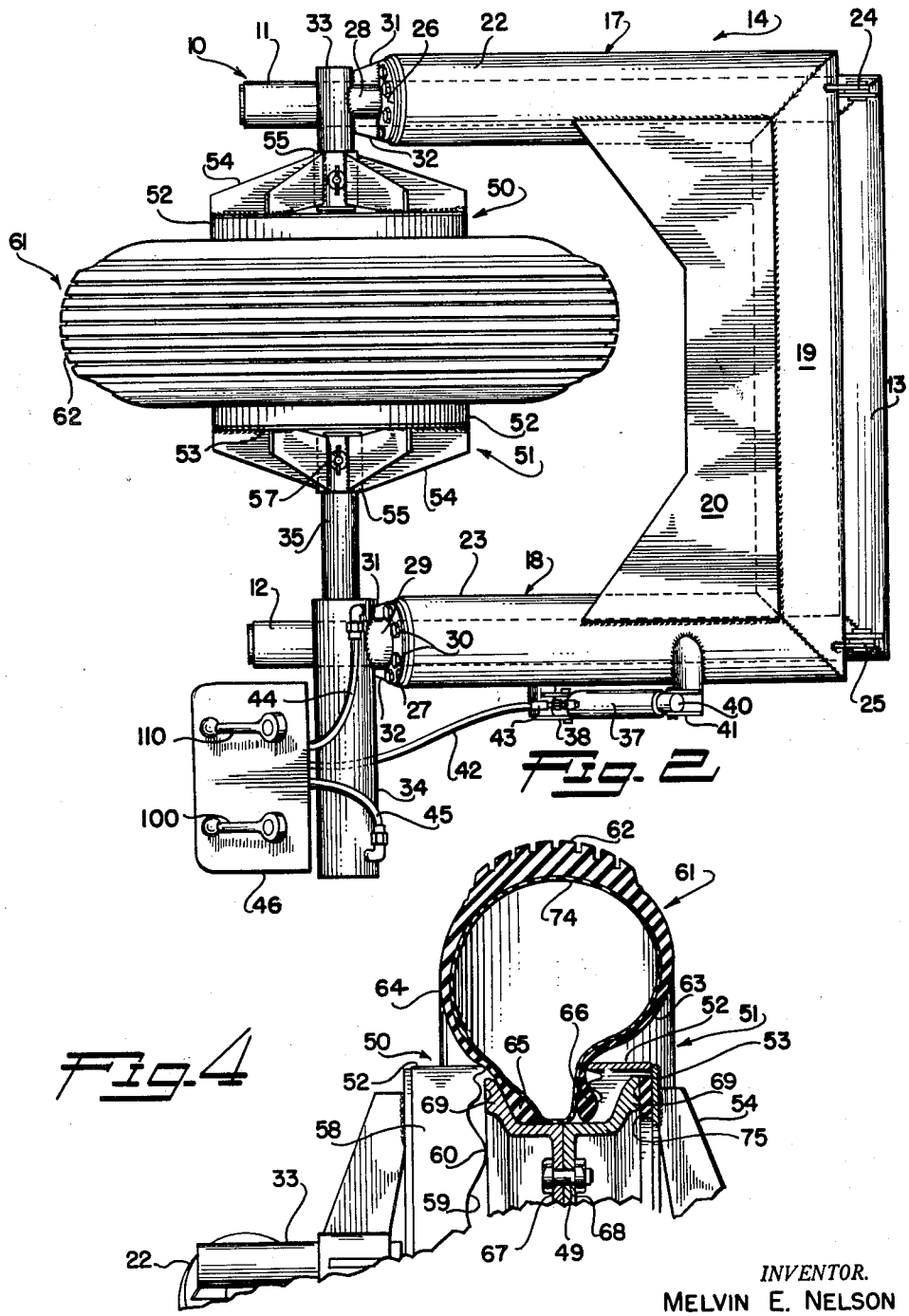

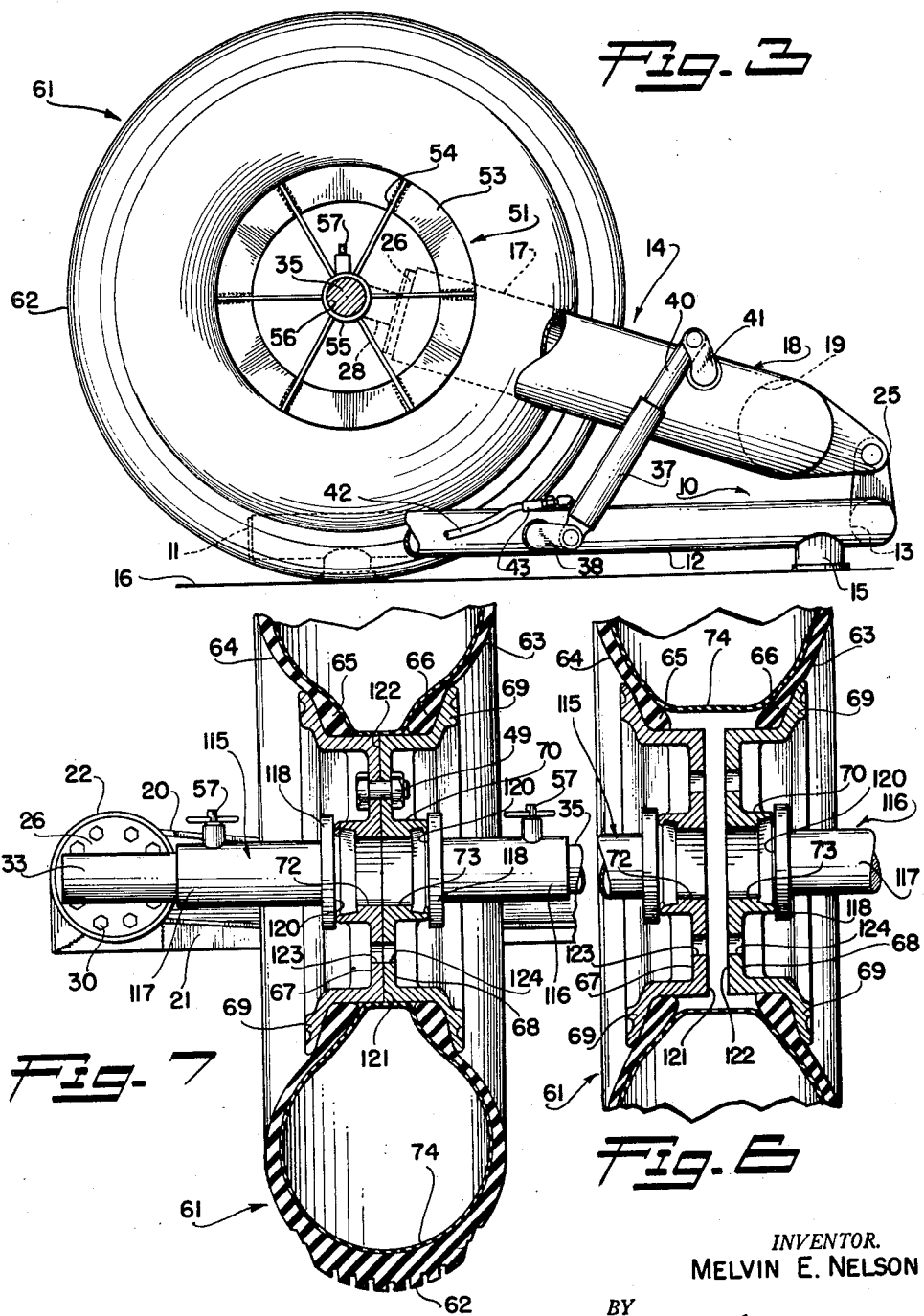

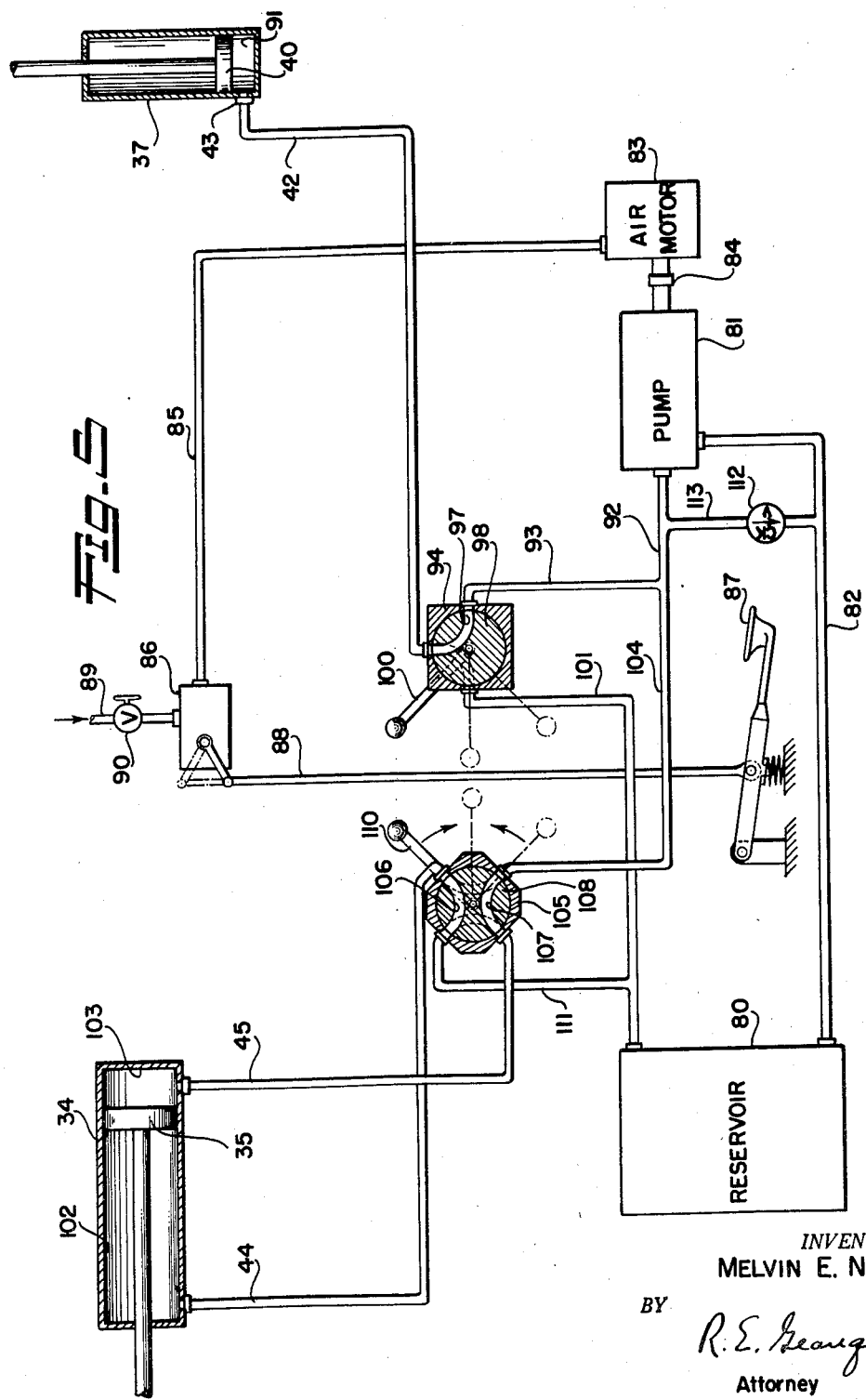

July 19, 1960     M. E. NELSON     2,945,522
POWER ACTUATED WHEEL ELEVATING AND SUPPORTING STAND
Filed June 28, 1957     5 Sheets-Sheet 5

INVENTOR.
MELVIN E. NELSON
BY
Attorney

United States Patent Office 2,945,522
Patented July 19, 1960

2,945,522

POWER ACTUATED WHEEL ELEVATING AND SUPPORTING STAND

Melvin E. Nelson, Santa Barbara, Calif., assignor, by mesne assignments, to The Hufford Corporation, El Segundo, Calif., a corporation of California Filed June 28, 1957, Ser. No. 668,722

2 Claims. (Cl. 144—288)

The present invention relates to new and useful improvements in tire tools and more particularly to a novel mechanism adaptable to perform the operations of loosening pneumatic tire casings from flanged wheel rims on which they are mounted, for re-assembling the casing on the rim and for supporting the tire during a wheel balancing operation.

In the past, it has been the conventional practice to employ a separate mechanism for performing the above operations which requires at least three separate and independently operated pieces of equipment. In general when these operations are to be performed on wheels having tires of large size and weight and which have been subjected to heavy duty usage such as, for example, tires used on road grading vehicles, heavy trucks and aircraft, each equipment is required to have a separate stand for supporting the tire, tools for performing a particular operation and means for actuating the tools. It has been necessary to employ separate equipment because in some instances, the wheel is preferably supported while resting on the ground and in other instances, it has been found desirable to support the wheel off the ground. Furthermore, since only one operation can be performed at a time on a given wheel, it was not thought necessary to incorporate the feature of tire tool interchangeability which offers greater flexibility and adaptability of the tire stand. Heretofore, a suitable mechanism or tire stand has never been available which is readily adaptable to receive the various tire tools required to perform a variety of specific operations or to support the wheel in various preferred positions.

Difficulties are encountered when employing separate equipment according to the conventional practice which are partially due to the fact that the wheel is sometimes supported on a bar which passes through the axle hole of the wheel. This practice sometimes causes damage to internal splines or bearings within the axle hole of the wheel and thereby prevents further use of the wheel until it has been suitably reworked. Also, conventional tools for loosening a tire casing from a rim, commonly referred to as breaking the tire beads, sometimes damages the casing by piercing the casing when the pressure applied to the tools is unevenly distributed over a wide area of the casing wall. In some instances, beads of a tire casing have been known to become welded to the rim so that the tools break through the casing wall before the casing beads have been freed due to an overloading of pressure applied to actuate the tools.

Once the tire casing has been removed from the rim, it is sometimes a difficult task to reassemble the casing on the rim. Reassembly is particularly difficult when the rim comprises a pair of flange members bolted together which are intended to embrace the beads of the casing. This difficulty is largely due to the fact that the beads of the tire casing resist the proper mating of the flange members so that the bolts may not be properly installed to hold the flange members together.

Still another problem existing in conventional practice is that of providing a suitable mechanism for supporting the assembled wheel during a wheel balancing operation. It is customary to pass a support bar through the axle hole in the rim and then rotate the wheel at various speeds. This practice has many disadvantages since the internal bearings or splines in the axle hole may be damaged or destroyed.

These difficulties are overcome in accordance with the present invention wherein a novel tire stand is provided comprising, in general, a power operated yoke pivotally mounted on a base into which a wheel may be manually positioned and subsequently supported either on or above the ground. The yoke is suitably constructed with support members so that wheels of relatively large size and weight may be accommodated. A powered ram mechanism is carried by the yoke which is adaptable to mount a variety of different tire tools engageable with opposite sidewalls of the tire for performing such operations as tire bead breaking, tire and rim reassembly, wheel balancing, etc. The action of the ram mechanism is such that the tire tools are urged together into engagement with the sidewalls of the tire. Other novel features reside in the tire tools included in the present invention which readily allow the tools to be detachably mounted on the ram mechanism and which avoid damaging the tire and/or rim or any bearings or splines carried within the axle hole of the rim.

Therefore, it is an object of the present invention to provide a novel stand mechanism for supporting a wheel in a substantially upright position either on the ground or above the ground having suitable supporting members so that wheels of substantial size and weight can be readily accommodated.

Another object of the present invention is to provide a novel stand mechanism positionable in a vertical plane with respect to the ground in order to accommodate tires of different heights and having adjustable mechanism carried on the stand for accommodating tires of various thickness. This last mentioned mechanism serving to converge toward the tire and into engagement therewith to support the tire in an upright position.

Another object of the present invention is to provide a novel universal tire stand adaptable to receive tire tools for loosening a tire casing from a flanged rim which are detachably carried by the tire stand without engaging or interfering with internal bores of the rim.

Still another object of the present invention is to provide a novel set of tire tools for loosening a tire casing from a flanged rim whereby the tire tools are caused to converge against opposite sidewalls of the casing by a hydraulic force urging each tire tool of the set towards one another to break the tire beads from the flanges of the rim.

Still a further object of the present invention is to provide a tire bead breaking mechanism capable of supporting the tire in an upright position while a pair of tire bead breaking tools are caused to converge upon opposite side walls of the casing in a fashion which evenly distributes pressure at selected points along the side walls of the casing adjacent the rim. A feature resides in the fact that the tire tools of the present invention allow for simultaneous or non-simultaneous breaking of both tire beads without damaging the tire casing.

Further objects and features of the present invention will be readily seen upon a reading of the following description with reference to the accompanying drawings wherein:

Figure 2 is a top plan view of the universal tire stand and set of tire tools shown in Figure 1;

Figure 3 is a side elevational view of the tire stand with parts broken away and shown in section;

Figure 4 is a sectional view of a set of tire tools for loosening a tire on a flanged rim as employed in the invention, illustrating the breaking of a single tire bead of a pair of beads;

Figure 5 is a schematic drawing of a suitable hydraulic system employed for elevating the tire stand and actuating tire tools such as shown in Figure 1;

Figure 6 illustrates the universal tire stand of Figure 1 having tire tools carried thereon for effecting the reassembly of a tire between a pair of flanged members comprising a wheel rim;

Figure 7 illustrates a tire reassembled on the wheel rim employing the tire tools of Figure 6;

Figure 1:
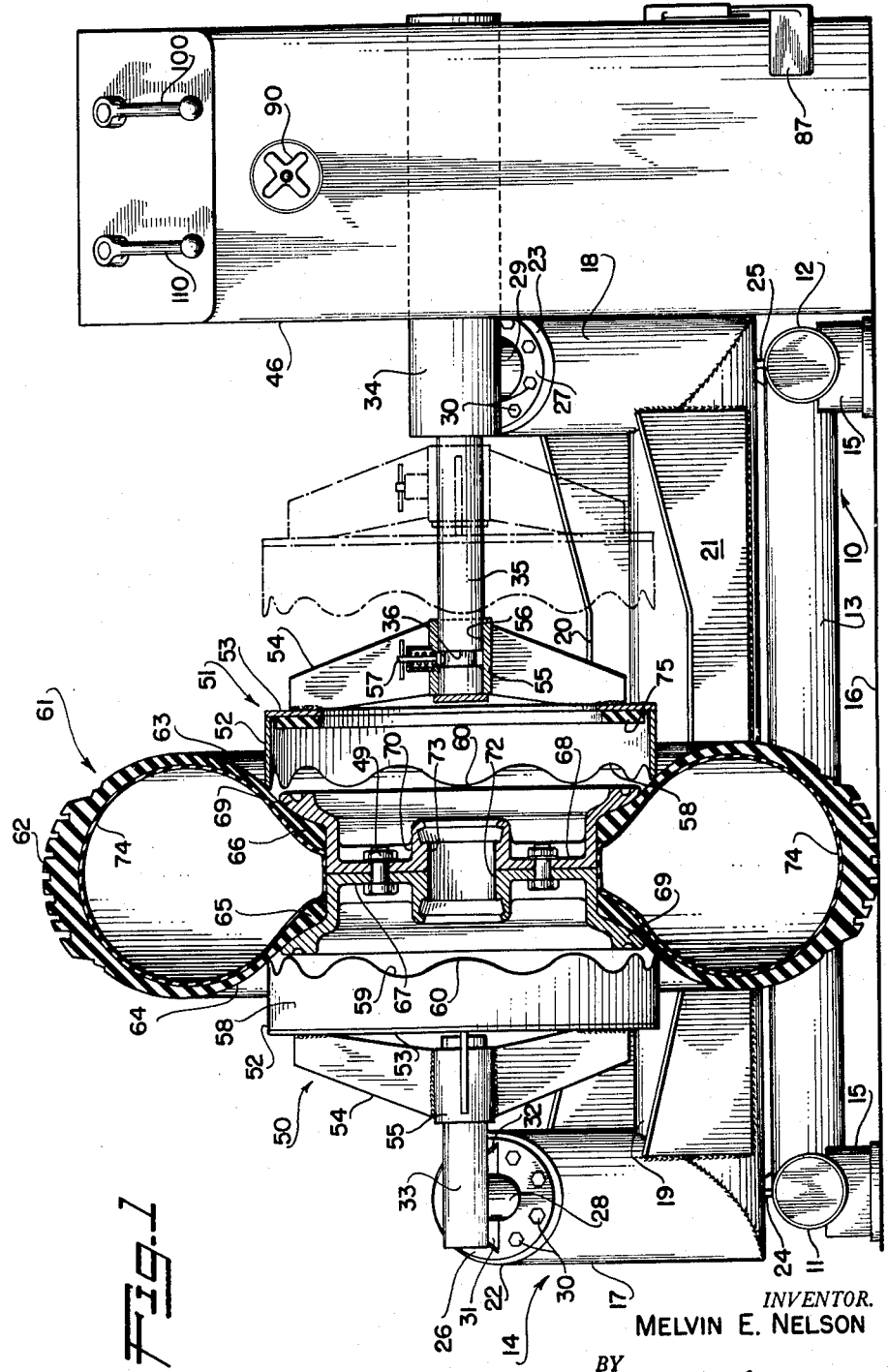
Figure 1 is a front elevational view of the universal tire stand in accordance with the present invention having a set of tire tools mounted thereon for loosening a tire from a flanged rim illustrating the tire, flanged rim and one tire tool of the set in section.

With reference to Figures 1, 2 and 3, a tire stand in accordance with the present invention is shown which comprises, in general, a U-shaped base 10 of welded tubular construction having a pair of base members 11 and 12 joined by a third member 13 on which a U-shaped yoke 14 is pivotally supported so that the yoke may be elevated with respect to the base. The base is provided with a plurality of feet such as a foot 15 for supporting the base on a surface 16 which may be a floor of a garage or hanger or the surface of an airport apron, for example.

The yoke includes a pair of legs 17 and 18 mounted on opposite ends of a member 19 to provide a work space between the legs. The yoke is of welded tubular construction and is reinforced by the provision of a pair of flat plates 20 and 21 suitably welded to member 19 and each leg of the yoke. The plates are configured to offer optimum strength and support for the yoke when relatively heavy loads are supported on ends 22 and 23 associated with legs 17 and 18 respectively. The plates are formed so that their opposite ends are wider than their mid-section. It is to be understood that the tubular construction of the base and yoke are by way of illustration and that other suitable forms of constructions may be employed such as channel sections or other beam shapes and configurations.

The yoke is pivotally mounted on the base 10 by means of a pair of hinges 24 and 25 welded between base member 13 and member 19 on opposite ends thereof. Construction in this manner permits pivotal action of the legs of the yoke so that ends 22 and 23 of the legs are movable between a position of rest upon the base and a desired position of elevation with respect to surface 16 about hinges 24 and 25.

Each leg end of yoke 14 carries a pair of plates 26 and 27 associated with legs 17 and 18 respectively which are employed for supporting a pair of tubes 28 and 29 which are secured to each plate by suitable means such as welding, for example. The plates are secured to the leg ends by a plurality of bolts such as bolt 30. Each tube is reinforced by a pair of braces 31 and 32 welded to opposite sides of the tube and to its associated plate. As shown more clearly in Figure 2, tube 28 is provided with a first tire tool mounting bar 33 and tube 29 is employed to carry a hydraulic cylinder 34 welded thereto having a slidable piston 35 serving as a second tire tool mounting bar. The tire tool mounting bars are arranged so that their ends opposite to the ends associated with the tubes 28 and 29 are projected towards each other between the legs of the yoke with the central axis of each rod in common alignment. Each bar is provided with an annular groove 36 adjacent its projected end adaptable to receive fastening devices carried by a variety of tire tools which will be described later. Piston 35 and cylinder 34 comprise, in combination with bar 33, a ram mechanism whereby piston 35 may be urged toward bar 33 or retracted from the bar 33 by means of a hydraulic pressure system.

With reference to Figures 2 and 3, means are shown for pivoting the yoke on hinges 24 and 25 which comprise a hydraulic cylinder 37 pivotally secured on one of its ends to base member 12 by means of a pivot arrangement 38 and having a slidable piston 40 pivotally secured on one end to leg 18 by a second pivot arrangement 41. Hydraulic fluid is supplied under pressure from a fluid reservoir (not shown) to cylinder 37 via a hose 42 suitably coupled to the cylinder by a fitting 43. Hose 42 also serves to return the fluid from the cylinder to the reservoir when the legs of the yoke are lowered. The normal weight of the yoke is sufficient to force hydraulic fluid out of the cylinder 37 to achieve the retraction of piston 40 into cylinder 37 and the lowering of the yoke legs.

Cylinder 34 is also coupled into the hydraulic system via hoses 44 and 45 so that fluid may be supplied under pressure to the cylinder in order to actuate piston bar 35. Inasmuch as cylinder 34 and piston 35 serve as a ram mechanism for causing piston 35 to travel towards and away from bar 33, it has been found desirable to employ a hydraulic system whereby piston 35 is powered in either direction by fluid under pressure. Thereby a pair of hoses are required for alternately supplying fluid to opposing ends of the cylinder whereas in the instance of cylinder 37 and piston 40, fluid need only be supplied under pressure to raise the yoke legs since the weight of the yoke will cause the piston to retreat into cylinder 37 when the pressure is relieved. A suitable hydraulic system for elevating the legs of the yoke and for advancing and retracting piston 35 will be described with references to later figures. The hydraulic system employed is merely by way of illustration and is not intended to form a part of the present invention other than to provide a means for actuating the respective ram mechanism and elevating the yoke. Except for the hoses already mentioned, the remainder of the hydraulic system may be encased within an enclosure 46 adjacent the stand.

The stand described with reference to Figures 1, 2, and 3 is designed to accommodate a variety of tire tools and to support a pneumatic tire including a wheel. For example, in the event that it is desired to remove a tire casing from a wheel rim, it is generally required that the casing beads be broken from the rim in order to effect removal of the casing. This is particularly necessary in instances where the tires have been subjected to heavy duty wear under a variety of strenuous conditions.

With reference to Figures 1, 2 and 3, a set of tire tools is shown in accordance with present invention for loosening tire casing beads from a rim which include a pair of cooperative tools 50 and 51 wherein each tool comprises a circular ring 52, an annular support 53 welded to the ring and a plurality of spokes such as spoke 54 connecting a hub 55 to the annular support. The plurality of spokes are arranged in spaced relationship with respect to each other and extend outwardly from hub 55. Hub 55 of each tool 50 and 51 is provided with an internal bore 56 which receives the projected end of one of the tool mounting bars 33 or 35 and is further provided with a spring tensioned pin fastening arrangement 57 which engages with annular groove 36 to retain the tire tools on their respective mounting bar. Each ring 52 associated with each tire tool of the set is provided with a scalloped periphery 58 having a plurality of alternate recesses 59 separated by alternate projections 60.

An assembled tire may be supported in an upright position in the space provided between the legs of the yoke by the set of tire tools 50 and 51, as shown in the figures, which tire assembly comprises a pneumatic tire 61 of the conventional multi-ply rubberized fabric type having a tread portion 62, a pair of casing sidewalls 63 and 64 separated by the tread portion and a pair of beads 65 and 66 integrally formed with each sidewall and a wheel comprising a pair of rims 67 and 68 secured together by a bolt and nut arrangement 49 and having a flange 69 projecting radially outward from a common hub 70. In the present instance, hub 70 of each rim is provided with a bore 72 arranged with several spline grooves 73 to illustrate that no part of the present invention engages or contacts the splines which would cause damage thereto. The tire may be either of the tubeless type or as shown in the figures, the tire may emloy an innertube 74. Air within the innertube, initially supplied to inflate the tube, urges beads 65 and 66 into firm engagement with flange 69 carried by each rim. Inasmuch as the stand of the present invention is adaptable to receive a variety of tires having different heights and thicknesses, the legs of yoke 14 may be elevated to a position where the central axis of the tire mounting tool bars is in alignment with the central axis of bore 72 carried by the hub of the rims. The ram mechanism may be actuated from its position of rest shown in dotted lines of Figure 1 to advance piston 35 toward the tire until the plurality of projections 60 arranged about the periphery of ring 51 of each tire tool engage the sidewalls of the tire. It is to be noted that projections 60 of the scalloped periphery 58 engage the side walls adjacent the flange 69 of each rim so that an even and controlled distribution of pressure or force may be applied to the sidewalls in order to break the pair of beads without damaging the tire casing. The scalloped feature of ring 52 permits the tire tools to concentrate pressure at predetermined locations about the opposing sidewalls so that a gradual and differential breaking of a single bead from the rim occurs.

A resilient ring 75 is provided against the face of annular support 53 engageable with flange 69 upon the breaking of a bead such as bead 66 from the inner face of the flange. As shown in Figure 4, it sometimes occurs that one bead of the pair carried by the casing, such as bead 65, fails to break from the inner surface of flange 69 associated with rim 67 even under extreme pressure while its opposite bead breaks freely. Under these circumstances, it is easily seen that the employment of resilient ring 75 prevents damage to annular support or the periphery of flange 69 when bead breaking is accomplished. Ring 75 serves as a cushion or pad suitable for absorbing the shock encountered by stopping the travel of tool 51 as it moves toward the tire by the ram mechanism. The width of circular ring 52 is sufficient to insure complete separation of the bead from the inner surface of the flange upon the engagement of the flange with the resilient ring 75 and the circular ring 52 is of sufficient diameter to encircle the rim including flange 69 so that its periphery readily engages casing sidewalls, such as sidewall 63, adjacent respective flanges.

In reference to Figure 5, a suitable hydraulic system is schematically shown for supplying fluid under pressure to cylinder 34 for actuating piston 35 of the ram mechanism and to cylinder 37 for actuating piston 40 for elevating the parallel legs of the yoke 14. The hydraulic fluid is stored in a reservoir 80 and is supplied to a conventional pump 81 via an input line 82.

The pump is operated by an air motor 83 via mechanical linkage 84 when air is supplied thereto via a line 85. The supply of air to line 85 is controlled by a valve 86 manually actuated to either an open condition as shown in solid lines, or closed position as shown in dotted lines, by an expansion spring tensioned foot pedal 87 which operates a linkage 88. A line 89 is suitably connected to an air supply source (not shown) and a safety valve 90 is coupled into this line and is employed to shut off the air supply when the hydraulic system is not in use. The pump furnishes the fluid under pressure to a chamber 91 of cylinder 37 via an output line 92, line 93, valve 94 and line 42. A supply of fluid furnished to chamber 91 under pressure causes piston 40 to advance.

It is to be noted that valve 94 is a three-way valve having a single passage 97 provided in a rotor 98 manually positioned by a handle 100. The upper position of the handle completes a fluid circuit from the reservoir 80 to cylinder 37 as described above. However, in its middle position, handle 100 rotates rotor 98 so that this circuit is broken and the fluid is retained within chamber 91 to hold piston 40 in a desired position of advancement. The lower position of handle 100 rotates rotor 98 so that passage 97 completes a fluid return circuit from line 42 via a line 101 to the reservoir 80 which allows piston 40 to retract within cylinder 37.

In order to advance and retract piston 35 associated with cylinder 34, hydraulic fluid is supplied to either a chamber 102 or a chamber 103 provided within cylinder 34 and separated by the piston 35. The supply of fluid under pressure to chamber 103 for advancing piston 35 is achieved via a line 104 coupled to pump output line 92, a valve 105 and line 45 to chamber 103. Inasmuch as piston 35 requires the furnishing of fluid under pressure to move in either direction of advancement or retraction, valve 105 is a four-way valve having a pair of passages 106 and 107 extending through a rotor 108 manually positionable by means of a handle 110. The upper position of handle 110 completes a fluid circuit from pump 81 via passage 107 to chamber 103 of cylinder 34 as described above to advance piston 35. A fluid return circuit is provided from chamber 102 via line 44, passage 106, a line 111 coupled into line 101 to the reservoir. In the middle position of handle 110, both passages 106 and 107 break hydraulic fluid circuits coupling the pump and reservoir to the cylinder 34 so that piston 35 is in its hold position. However, when handle 110 is actuated to its lower position, passages 106 and 107 couple lines 45 and 111 together and lines 44 and 104 together as indicated in dotted lines shown on rotor 108. This action supplies fluid under pressure to chamber 102 and exhausts fluid from chamber 103 to the reservoir whereby piston 35 is retracted into cylinder 34.

The hydraulic system shown in Figure 5 is capable of furnishing fluid to cylinders 34 and 37 under pressure of great magnitude. In order to prevent damage to a tire or to the yoke of the stand, a relief valve 112 is provided in a line 113 coupling output line 92 with line 82 so that when a predetermined fluid pressure has been reached, relief valve 112 will open and thereby prevent an increase of fluid under pressure being supplied to the cylinders.

As shown in Figures 6 and 7, tire tools 50 and 51 carried on mounting bars 33 and 35 and which were employed for tire bead breaking functions have been removed by disengaging fastening means 57 with annnular ring 36 provided on each mounting bar and replaced with a pair of tire tools 115 and 116 which are employed for reassembling tire casing 61 on to wheel rims 67 and 68. Tools 115 and 116 are retained on rods 33 and 35 by fastening means 57 passing through a cylinder 117 associated with each tool and into engagement with annular notch 36 similar to the fashion employed in securing other types of tire tools, such as tools 50 and 51.

Each tire tool 115 and 116 is provided with a disk 118 having a protruding face 120 engageable with the periphery of hub 70 of the wheel rims. Upon advancement of mounting bar 35 by the ram mechanism, rims 67 and 68 are compressed against the resilient spreading action of the tire casing sidewalls and beads so that surfaces 121 and 122 carried by the rims engage to meet common bores, such as bore 123 and 124. Bolt and nut arrangement 49 may be readily secured through the mated bores provided in the rims to secure the pair of rims together.

Figure 9:
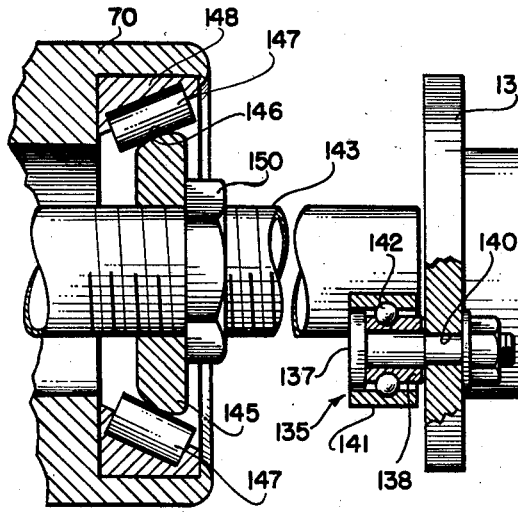
Figure 9 is an enlarged view of the wheel supporting means employed for wheel balancing operations.
Figure 10:
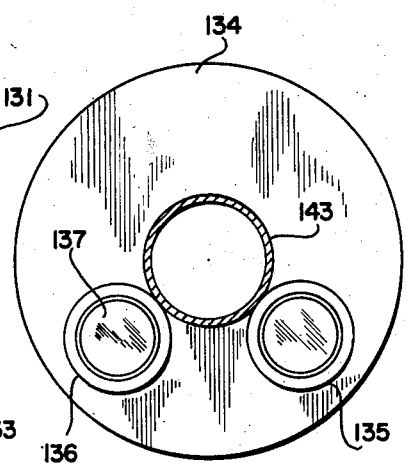
Figure 10 is a view of the wheel supporting means taken in the direction of arrows 10—10 of Figure 8.
Figure 8:
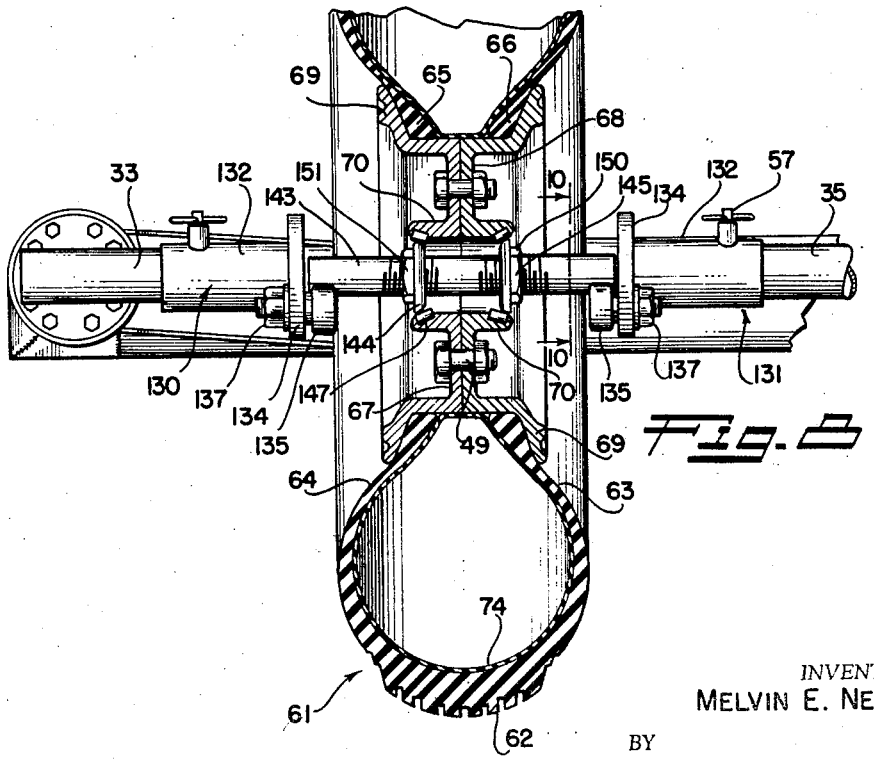
Figure 8 illustrates the universal tire stand of Figure 1 carrying tire tools suitable for rotatably supporting a tire and wheel during the performance of wheel balancing operations.

As shown in Figure 8, mounting rods 33 and 35 are employed for carrying a pair of tire tools 130 and 131 which are employed for tire and wheel balancing operations. Each tire tool comprises a cylinder 132 having an internal bore 133 as shown in Figure 9, which receives a protruding end of a mounting bar and is held to the mounting bar by means of fastening device 57. The cylinder is provided with a disk 134 of larger diameter than cylinder 131 which serves as a mounting support for a pair of rollers 135 and 136, as shown more clearly in Figure 10. The rollers are mounted on to their respective disks 134 by means of a bolt and nut arrangement 137 which passes through an inner race 138 of the roller and a bore 140 provided in the disk. This arrangement allows outer race 141 to freely rotate on ball bearings 142. The pair of rollers 135 and 136 are located below the central axis of the disk 134 and on either side of the central perpendicular axis on the disk. This arrangement allows for the mounting means which carries tire 61 to be carried by tire tools 130 and 131. This latter means comprises a threaded shaft 143 carrying a pair of plates 144 and 145. As shown more clearly in Figure 9 each plate, such as plate 145 is provided with a roller surface 146 adapted to engage the surface of a plurality of rollers such as roller 147 associated with a bearing 148 retained on opposite sides of hub 70. A pair of retaining nuts 150 and 151 are employed for suitably securing the plates in contact with rollers 147.

Shaft 143 is suitably positioned within the bore of hub 70 so that its opposing ends extend outward from the periphery of the hub and the plates 144 and 145 are suitably engaged with the rollers of each bearing. The legs 17 and 18 of the yoke may be elevated so that the opposing ends of shaft 143 are engaged with and between the pair of rollers carried by disc 134 of each tire tool 130 and 131. Continued elevation of the yoke legs causes the tire to be lifted in accordance therewith and totally supported off of the floor or ground on the rollers via shaft 143. Tire 61 may now be rotated by manual or simple automatic means for performing the wheel balancing operation.

Actual operation will be described with reference to the figures employing the tire stand of the present invention having tire tools 50 and 51 carried by mounting bars 33 and 35 respectively. It is to be understood that other tire tools may be employed and that the following operational discussion referring specifically to tire tools 50 and 51 is by way of illustration and it is not intended to limit the scope of the present invention. A tire 61 mounted between flanges 69 carried by a pair of secured wheel rims 67 and 68 may be manually rolled between the parallel legs 17 and 18 of yoke 14 of the tire stand. In order to support the tire in an upright position, an operator may actuate handle 100 to its upper position as shown in Figure 5, which rotates rotor 98 so that passage 97 completes a hydraulic circuit from output line 92 coupled into pump 81 to chamber 91 of cylinder 37. The operator may now depress foot treadle 87 with his foot to actuate air valve 86, which in turn, causes air motor 83 to actuate pump 81. The actuation of pump 81 draws hydraulic fluid from reservoir 80 via line 82 and pumps this fluid via lines 92 and 93 through passage 97 of valve 94 and line 42 to the hydraulic cylinder. This supply of hydraulic fluid provided to cylinder 37 under pressure by means of pump 81 urges piston 40 to advance from its condition of rest within the cylinder.

As piston 40 advances from cylinder 37, the parallel legs 17 and 18 of yoke 14 are elevated from a position of rest on base member legs 11 and 12 respectively. Pivotal mountings 38 and 41 connecting cylinder 37 to base member 12 and piston 40 to leg 18 permit the piston and cylinder to be positioned between the base member 12 and leg 18 while still maintaining adequate support for the yoke 14. The elevation of yoke legs 17 and 18 pivots yoke 14 on hinges 24 and 25 carried by base member 13 to elevate ends 22 and 23 associated with each leg of the yoke.

When the leg ends 22 and 23 have been raised to a suitable elevation, the operator may move handle 100 to its middle position, as shown in Figure 5, which positions rotor 98 to disconnect passage 97 from the hydraulic circuit so that hydraulic fluid previously supplied to chamber 91 of cylinder 37 remains within the cylinder and prevents either advancement or retraction of piston 40. Pressure on foot treadle 87 may be removed to discontinue operation of the air motor and consequently cease pump operation. With handle 100 being actuated to its middle position, piston 40 and cylinder 37 hold ends 22 and 23 in a certain position of elevation with respect to the base member 11 and 12. The usual procedure is to elevate ends 22 and 23 to a point where the central axis of mounting rod 33 and 35 lie in common with the central axis of the wheel rim tire.

At this time, handle 110 of valve 105 may be manually positioned by the operator to its upper position, as shown in Figure 5 in solid lines, so that rotor 108 connects passage 107 between lines 104 and line 45. This connection completes a path for hydraulic fluid from pump 81 into chamber 103 associated with cylinder 34. The furnishing of fluid to chamber 103 under pressure causes piston or mounting bar 35 to advance from cylinder 34. The forcible advancement of piston 35 causes fluid contained within chamber 102 of cylinder 34 to flow through line 44, passage 106, line 111 to reservoir 80. In order to provide fluid to chamber 103 under pressure, foot treadle 87 may be actuated by the operator to open valve 86 for commencing operation of air motor 83 and hence, commence the operation of pump 81.

As piston or mounting bar 35 advances from cylinder 34 under pressure of the ram mechanism, tire tool 51 is urged toward engagement with tire 61 from a position of rest as illustrated in dotted lines as shown in Figure 1. Continued advancement of mounting bar 35 causes the engagement of projections 60 of the scalloped periphery 58 of ring 52 with sidewall 63 of the tire adjacent the periphery of flange 69 of rim 68. The forcible engagement of tire tool 51 with sidewall 63 urges sidewall 64 into forcible engagement with tire tool 50 so that its associated projections 60 of ring 52 encounter sidewall 64 adjacent the flange 69 carried by rim 67. The provision of the scalloped periphery of ring 52 allows for the application of pressure at predetermined locations about the sidewalls of the tire 61. Because of this construction, less pressure need be applied about the entire sidewall area of the tire and the pressure which is applied at these predetermined locations need not be as great since the tire will gradually separate from the flanged rim at varying intervals.

As the ram mechanism continues to urge tire 51 into firm contact with sidewall 63 via spokes 54, tire bead 66 begins to gradually break away from the inner surface of flange 69 of rim 68 until the bead separates completely with the flange as shown more clearly in Figure 4. Continued depression of sidewall 63 is avoided by the engagement of the periphery flange 69 with pad ring 75. Inasmuch as bead 65 may not be broken from its associated flange, the ram mechanism will continue to urge toward tire tool 50 to depress sidewalls 64 so that bead 65 is caused to break away from the inner surface of flange 69 of rim 67.

At this time, both beads are broken and the tire has been separated from its flange rims. In order to prevent damage of the hydraulic system or of the tire, pressure is immediately relieved via line 113 by means of check valve 112. However, should both or either of the beads fail to break upon normal operation of the ram mechanism, a constant pressure may be exerted upon the sidewall associated with the unbroken bead by actuating handle 110 to its middle position as shown in Figure 5. This actuation causes passage 106 and 107 to disrupt hydraulic circuits to and from the pump and reservoir and cylinder 34, so that fluid previously supplied remains within the cylinder to hold the piston.

Once both beads have been broken, piston 35 may be retracted into cylinder 34 by actuating handle 110 into its lower position as shown in Figure 5 to rotate rotor 108 of valve 105 to position passage 106 so that fluid contained in chamber 103 returns to reservoir 80 and passage 107 couples fluid furnished by pump 81 to chamber 102 to force retraction of piston 35. Upon the retraction of piston 35 to a suitable distance, tire tools 50 and 51 disengage with sidewalls 63 and 64 of tire 61 and the tire may be rolled out of the space provided between legs 17 and 18 of yoke 14 so that mechanics may completely disassemble the wheel rim and tire.

In order to lower elevated ends 22 and 23 of legs 17 and 18, handle 100 may be positioned to its lower position as shown in Figure 5, which rotates rotor 98 of valve 94 so that passage 97 couples line 42 with line 101 and the weight of the yoke legs forces piston 40 into cylinder 37 which forces fluid out of chamber 91 through line 42 and valve 94 to reservoir 80.

Various other modifications are contemplated by those skilled in the art without departing from the spirit and scope of the invention as hereinafter defined by the appended claims.

What is claimed is:

1. Apparatus for supporting a wheel and tire assembly comprising the combination of, a base, a yoke having a pair of parallel outwardly projecting legs from a common member pivotally mounted on the base, the legs of the yoke extending at least from the periphery of the tire assembly to the central axis thereof, the wheel and tire assembly manually positionable between the parallel legs, powered means pivotally connecting at least one leg of the yoke to the base for elevating the projected legs from a normal position of rest on the base, a mounting bar secured to the projected end of each leg of the yoke extending toward each other between the legs, a pair of identical wheel or tire engaging attachments, each attachment detachably carried on each mounting bar, and powered mechanism carried by at least one mounting bar for urging the attachments into forcible engagement with opposite sides of the assembly to support the assembly centrally.

2. Apparatus for supporting a wheel and tire assembly comprising the combination of, a base, a yoke having a pair of parallel outwardly projecting legs from a common member pivotally mounted on the base, the legs of the yoke extending at least from the periphery of the tire assembly to the central axis thereof, the wheel and tire assembly manually positionable between the parallel legs, powered means pivotally connecting at least one leg of the yoke to the base for elevating the projected legs including the assembly from a normal position of rest with respect to the base, a pair of mounting bars lying on a common central axis carried by the projecting ends of the legs and extending into the cavity of the yoke from opposing directions, one mounting bar being non-movable and secured to one leg of the pair in fixed relationship while the other mounting bar being movably carried by the other leg of the pair and arranged to move toward the secured mounting bar, a set of wheel or tire engaging attachments detachably connected on the mounting bars arranged to engage opposite sides of the assembly to hold the assembly in an upright position to support the assembly centrally, and a powered mechanism for actuating the movable mounting bar to urge the set of attachments into forcible engagement with the assembly.

References Cited in the file of this patent

UNITED STATES PATENTS

| | | |
|---|---|---|
| 1,003,753 | Jost | Sept. 19, 1911 |
| 2,117,073 | Wochner | May 10, 1938 |
| 2,201,982 | Bazarek | May 28, 1940 |
| 2,418,849 | Polt | Apr. 15, 1947 |
| 2,470,534 | Thomas | May 17, 1949 |
| 2,518,126 | Daw et al. | Aug. 8, 1950 |
| 2,521,149 | Butler et al. | Sept. 5, 1950 |
| 2,546,849 | Branick | Mar. 27, 1951 |
| 2,562,995 | Watkins | Aug. 7, 1951 |
| 2,753,924 | Pearne | July 10, 1956 |
| 2,762,424 | Zito | Sept. 11, 1956 |
| 2,783,830 | Pozerycki et al. | Mar. 5, 1957 |
| 2,832,400 | Laughlin | Apr. 29, 1958 |